(12) United States Patent
    Wagstaff et al.

(10) Patent No.: US 10,831,980 B2
(45) Date of Patent: *Nov. 10, 2020

(54) USING UNUSED WIRES ON VERY-LARGE-SCALE INTEGRATION CHIPS FOR POWER SUPPLY DECOUPLING

(71) Applicant: International Business Machines Corporation, Armonk, NY (US)

(72) Inventors: Alan P. Wagstaff, Rochester, MN (US); David Wolpert, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/553,463

(22) Filed: Aug. 28, 2019

(65) Prior Publication Data

US 2019/0384887 A1    Dec. 19, 2019

Related U.S. Application Data

(63) Continuation of application No. 16/009,605, filed on Jun. 15, 2018, now Pat. No. 10,503,864.

(51) Int. Cl.
    *G06F 30/398* (2020.01)
    *G06F 30/394* (2020.01)
    *G06F 111/20* (2020.01)

(52) U.S. Cl.
    CPC .......... *G06F 30/398* (2020.01); *G06F 30/394* (2020.01); *G06F 2111/20* (2020.01)

(58) Field of Classification Search
    CPC .............................. G06F 30/398; G06F 30/394
    See application file for complete search history.

(56) References Cited

U.S. PATENT DOCUMENTS

| 6,084,779 A | 7/2000 | Fang |
| 9,735,029 B1 | 8/2017 | Chu et al. |
| 9,941,154 B2 | 4/2018 | Song et al. |
| 2008/0072192 A1* | 3/2008 | Lenahan ............... G06F 30/36 716/113 |

(Continued)

OTHER PUBLICATIONS

Appendix P; List of IBM Patent or Applications Treated as Related, Aug. 28, 2019, 2 pages.

(Continued)

*Primary Examiner* — Stacy Whitmore
(74) *Attorney, Agent, or Firm* — Nathan M. Rau

(57) ABSTRACT

Using unused wires on VLSI chips for power supply decoupling including generating a VLSI chip design by: identifying floating wires in a VLSI chip; placing a via at each intersection between each floating wire and a power rail; determining a number of design rule violations for each via at each intersection; resolving the design rule violations for each via not on a major power rail; resolving the design rule violations for each via on a major power rail after resolving the design rule violations for each via not on a major power rail; after resolving the design rule violations for each via on a major power rail, identifying floating wires without a via; and for each floating wire without a via, identify an intersection with a least number of design rule violations and resolve the number of design rule violations by removing adjacent vias on adjacent wires.

20 Claims, 9 Drawing Sheets

(56) References Cited

U.S. PATENT DOCUMENTS

| | | |
|---|---|---|
| 2010/0181101 A1 | 7/2010 | Han et al. |
| 2015/0076704 A1 | 3/2015 | Song et al. |
| 2017/0323030 A1 | 11/2017 | Datta et al. |
| 2018/0181687 A1 | 6/2018 | Datta et al. |
| 2018/0247008 A1 | 8/2018 | Hamouda |

OTHER PUBLICATIONS

U.S. Appl. No. 16/009,605, to Alan P. Wagstaff et al., entitled, *Using Unused Wires on Very-Large-Scale Integration Chips for Power Supply Decoupling*, assigned to International Business Machines Corporation, 41 pages, filed Jun. 15, 2018.

\* cited by examiner

USING UNUSED WIRES ON VERY-LARGE-SCALE INTEGRATION CHIPS FOR POWER SUPPLY DECOUPLING

CROSS-REFERENCE TO RELATED APPLICATION

This application is a continuation application of and claims priority from U.S. patent application Ser. No. 16/009,605, filed Jun. 15, 2018.

BACKGROUND

Field of the Invention

The field of the invention is data processing, or, more specifically, methods, apparatus, and products for using unused wires on very-large-scale integration chips for power supply decoupling.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for using unused wires on very-large-scale integration (VLSI) chips for power supply decoupling are disclosed in this specification. Using unused wires on VLSI chips for power supply decoupling includes generating a VLSI chip design by: identifying floating wires in a VLSI chip, wherein the floating wires are disconnected from power rails; placing a via at each intersection between each floating wire and a power rail; determining a number of design rule violations for each via at each intersection; resolving the design rule violations for each via not on a major power rail, including keeping each via not on a major power rail with resolvable design rule violations and removing each via not on a major power rail with unresolvable design rule violations; resolving the design rule violations for each via on a major power rail after resolving the design rule violations for each via not on a major power rail, including keeping each via on a major power rail with resolvable design rule violations and removing each via on a major power rail with unresolvable design rule violations; after resolving the design rule violations for each via on a major power rail, identifying floating wires without a via; and for each floating wire without a via, identify an intersection with a least number of design rule violations and resolve the number of design rule violations by removing adjacent vias on adjacent wires.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
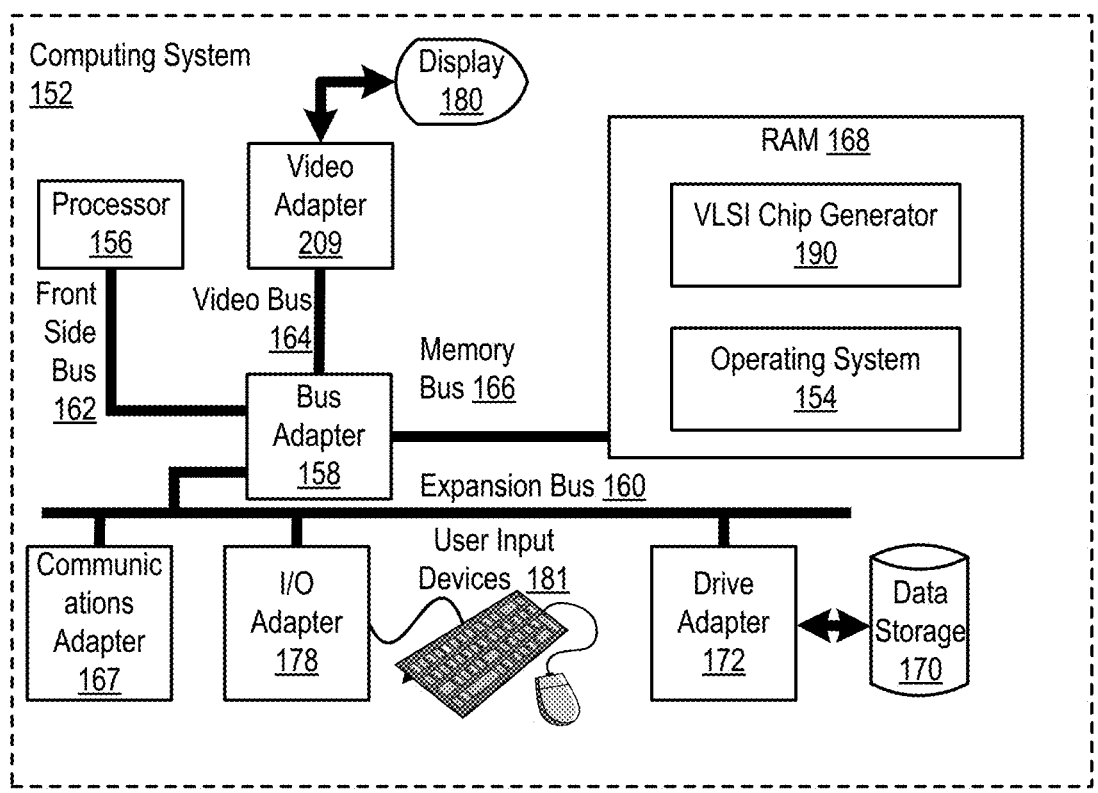
FIG. 1 sets forth a block diagram of an example system configured for using unused wires on very-large-scale integration (VLSI) chips for power supply decoupling according to embodiments of the present invention.

Exemplary methods, apparatus, and products for using unused wires on VLSI chips for power supply decoupling in accordance with the present invention are described with reference to the accompanying drawings, beginning with FIG. 1. FIG. 1 sets forth a block diagram of automated computing machinery comprising an exemplary computing system (152) configured for using unused wires on VLSI chips for power supply decoupling according to embodiments of the present invention. The computing system (152) of FIG. 1 includes at least one computer processor (156) or 'CPU' as well as random access memory (168) (RAM') which is connected through a high speed memory bus (166) and bus adapter (158) to processor (156) and to other components of the computing system (152).

Stored in RAM (168) is an operating system (154). Operating systems useful in computers configured for using unused wires on VLSI chips for power supply decoupling according to embodiments of the present invention include UNIX®, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is a VLSI chip generator (190), a module for using unused wires on VLSI chips for power supply decoupling according to embodiments of the present invention.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for using unused wires on VLSI chips for power supply decoupling according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for using unused wires on VLSI chips for power supply decoupling according to embodiments of the present invention include modems for wired dial-up communications, Ethernet (IEEE 802.3) adapters for wired data communications, and 802.11 adapters for wireless data communications.

FIGS. 2-6 show an exemplary system for using unused wires on very-large-scale integration (VLSI) chips for power supply decoupling according to embodiments of the present invention. Specifically, FIGS. 2-6 depict different stages in a process of efficiently placing vias to connect power rails to floating wires in order to create additional capacitance on an integrated circuit. The process includes generating a VLSI chip design by: identifying floating wires in a VLSI chip, wherein the floating wires are disconnected from power rails; placing a via at each intersection between each floating wire and a power rail; determining a number of design rule violations for each via at each intersection; resolving the design rule violations for each via not on a major power rail, including keeping each via not on a major power rail with resolvable design rule violations and removing each via not on a major power rail with unresolvable design rule violations; resolving the design rule violations for each via on a major power rail after resolving the design rule violations for each via not on a major power rail, including keeping each via on a major power rail with resolvable design rule violations and removing each via on a major power rail with unresolvable design rule violations; after resolving the design rule violations for each via on a major power rail, identifying floating wires without a via; and for each floating wire without a via, identify an intersection with a least number of design rule violations and resolve the number of design rule violations by removing adjacent vias on adjacent wires.

Using unused wires on VLSI chips for power supply decoupling may also include generating a VLSI chip design by: identifying floating wires in a VLSI chip, wherein the floating wires are disconnected from power rails and transistor gates/drains/sources; placing a via at each intersection between each floating wire and a power rail to create decoupling grid extensions; determining a number of design rule violations for each via at each intersection between these extensions and the original power grid; resolving the design rule violations on vias between grid extensions that do not pass design rule checks by changing the type (i.e. mask or size) of the via, and removing any vias between grid extensions that cannot be resolved; resolving the design rule violations for each via between a major power rail and a grid extension after resolving the design rule violations for each via between grid extensions by changing the type of the via, and removing each via on a major power rail with unresolvable design rule violations; after resolving the design rule violations for each via on a major power rail, identifying floating wires without a via; and for each floating wire without a via, identify an intersection with a least number of design rule violations and resolve the number of design rule violations by removing adjacent vias on adjacent wires.

Figure 2:
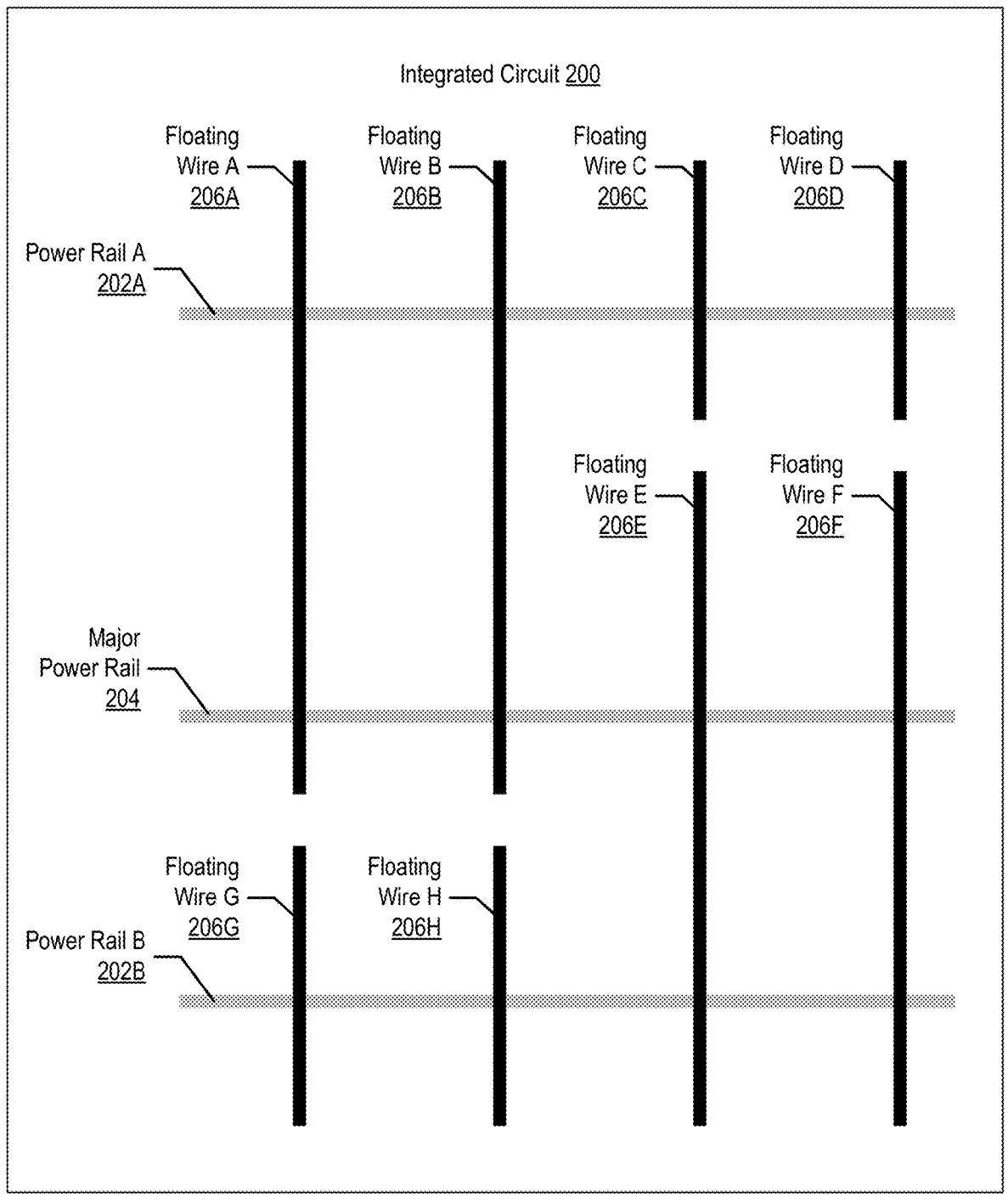
FIG. 2 sets forth a block diagram of an example system configured for using unused wires on VLSI chips for power supply decoupling according to embodiments of the present invention.

As shown in FIG. 2, the exemplary integrated circuit (200) includes three power rails (major power rail (204), power rail A (202A), power rail B (202B)), and eight floating wires (floating wire A (206A), floating wire B (206B), floating wire C (206C), floating wire D (206D), floating wire E (206E), floating wire F (206F), floating wire G (206G), floating wire H (206H)). The integrated circuit (200) may be a processor such as processor (156) in FIG. 1. The integrated circuit (200) may be a VLSI chip manufactured using semiconducting materials and millions of transistors. Such a VLSI chip may be a self-aligned double patterning (SADP) integrated circuit in which wires (i.e., traces or shapes) are placed throughout the integrated circuit whether or not the wires are utilized by the devices of the integrated circuit.

During the design process for SADP integrated circuits, wires are cut or sliced as required by the design. This process may leave some wires disconnected from any active circuit including power rails (major power rail (204), power rail A (202A), power rail B (202B)). A floating wire (floating wire A (206A), floating wire B (206B), floating wire C (206C), floating wire D (206D), floating wire E (206E), floating wire F (206F), floating wire G (206G), floating wire H (206H)) is a wire disconnected from a power rail (major power rail (204), power rail A (202A), power rail B (202B)). Floating wires may also be disconnected from other circuitry, such as transistor gates, drains, and sources. Floating wires may be unused by other elements on the integrated circuit. Floating wires may be referred to as floating shapes or floating traces.

During the design process for non-SADP integrated circuits, floating wires may be generated in locations on the VLSI chip requiring increased density. In some modern computer chip design processes, providing an even density on each of the layers improves manufacturability. Floating wires may be generated in locations that lack other components so that, for example, during the polishing phase of manufacture, the surface being polished is done so evenly.

The power rails (major power rail (204), power rail A (202A), power rail B (202B)) are wires that carry a positive or negative supply voltage. A major power rail (204) is a wire that is part of the chip power grid prior to the addition of decoupling extensions. Power rails (or non-major power rails) refer to decoupling extensions on the same layer of the major power rail that aids in connecting floating wires to the rest of the power grid.

The power rails may exist on layers separate from layers hosting wires and other components of the integrated circuit. As shown in FIGS. 2-6, the power rails (major power rail (204), power rail A (202A), power rail B (202B)) are on layer separate and distinct from the layer upon which the floating wires (floating wire A (206A), floating wire B (206B), floating wire C (206C), floating wire D (206D), floating wire E (206E), floating wire F (206F), floating wire G (206G), floating wire H (206H)) exist.

Because the wires on VLSI chips may be placed very close together (e.g., 20 nanometers), the wires may be used to generate capacitance by attaching adjacent wires or groups of wires to power and ground. This capacitance may be used to increase decoupling capacitance for circuit stability and improved performance. Each floating wire to be used for capacitance may be coupled to a power rail using at least one via. A via is a conductive connection between layers of an integrated circuit. A via may be used to couple a floating wire to a power rail such that the floating wire conducts the positive or negative supply voltage of the power rail.

A via type refers to a permutation of via matrices and/or a size of the via (or different masks in the case of multi-patterned via layers). Vias may be placed using different processes. Vias placed using different processes are referred to as different types (or colors) of vias. Via placement is subject to design rules (also referred to as ground rules). The design rules dictate how vias may be placed on the integrated circuit. For example, design rules may dictate how closely two vias of the same type may be placed. For the purposes of the example of FIG. 2-6, assume that there are two available via types (type 1 and type 2).

FIG. 2 shows the exemplary system at an initial stage in the process of efficiently placing vias to connect power rails to floating wires in order to create additional capacitance on an integrated circuit. During the stage depicted in FIG. 2, the floating wires (floating wire A (206A), floating wire B (206B), floating wire C (206C), floating wire D (206D), floating wire E (206E), floating wire F (206F), floating wire G (206G), floating wire H (206H)) are identified. The floating wires may also be attributed to either power or ground. For the purposes of the example process depicted in FIG. 2 through FIG. 6, assume that each of the floating wires shown have all been attributed to power or have all been attributed to ground.

Figure 3:
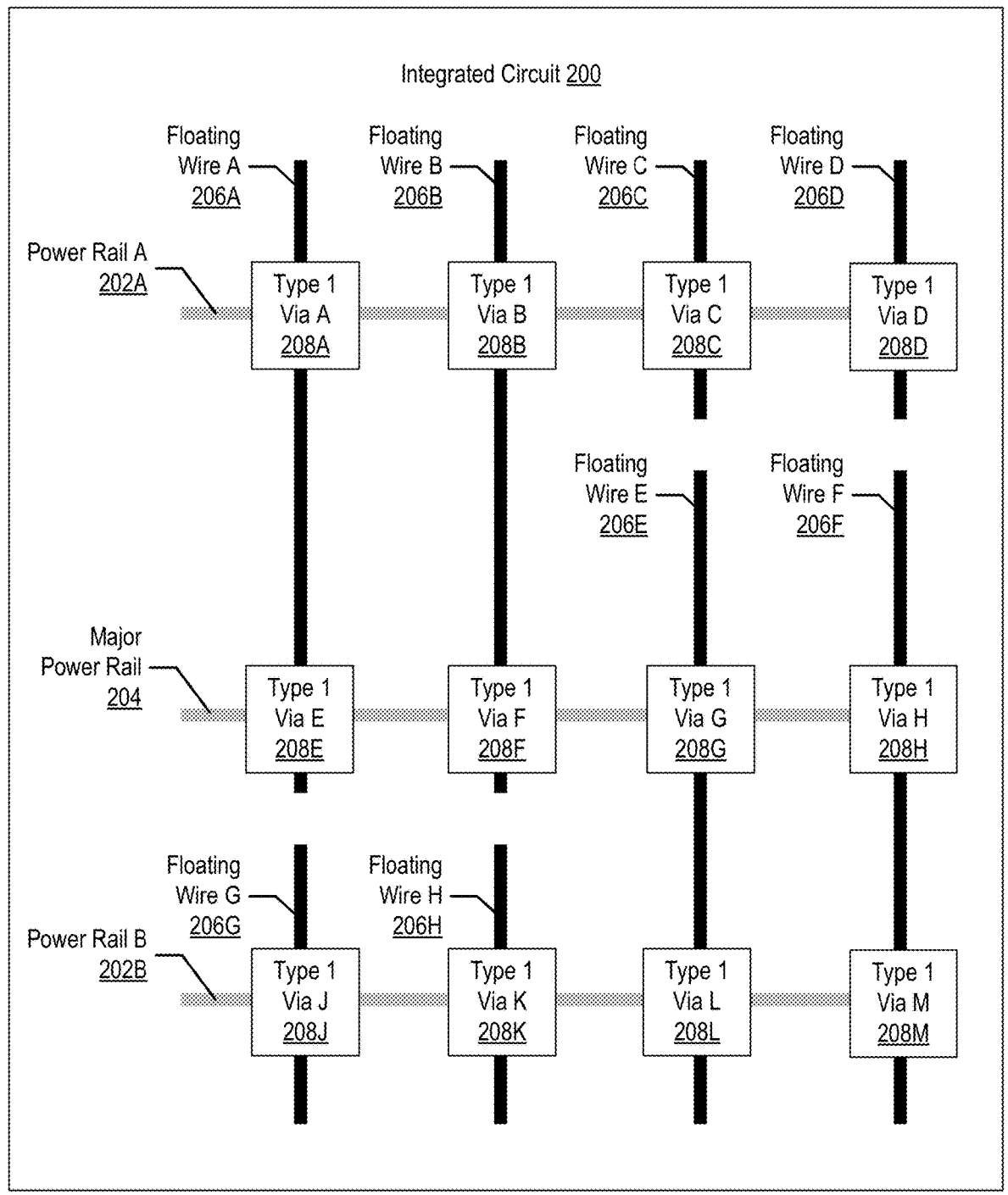
FIG. 3 sets forth a block diagram of an example system configured for using unused wires on VLSI chips for power supply decoupling according to embodiments of the present invention.

FIG. 3 shows an exemplary system for using unused wires on VLSI chips for power supply decoupling according to embodiments of the present invention. FIG. 3 shows the exemplary system at a stage in the process of efficiently placing vias to connect power rails to floating wires in order to create additional capacitance on an integrated circuit.

During the stage depicted in FIG. 3, type 1 vias (type 1 via A (208A), type 1 via B (208B), type 1 via C (208C), type 1 via D (208D), type 1 via E (208E), type 1 via F (208F), type 1 via G (208G), type 1 via H (208H), type 1 via J (208J), type 1 via K (208K), type 1 via L (208L), type 1 via M (208M)) are placed at each intersection between each floating wire (floating wire A (206A), floating wire B (206B), floating wire C (206C), floating wire D (206D), floating wire E (206E), floating wire F (206F), floating wire G (206G), floating wire H (206H)) and power rail (major power rail (204), power rail A (202A), power rail B (202B)).

Once a via has been placed at each intersection between each floating wire and power rail, a number of design rule violations for each via at each intersection is determined. For the purposes of the example of FIG. 2-6, assume that the design rules dictate that no two vias of the same type may be horizontally adjacent to each other on power rail A (202A), power rail B (202B), or the major power rail (204). Further, assume that no two vias of the same type may be vertically adjacent to each other on the major power rail (204) and power rail B (202B).

In the exemplary integrated circuit of FIG. 3, type 1 via A (208A) has one design rule violation for being horizontally adjacent to type 1 via B (208B). Type 1 via B (208B) has two design rule violations for being horizontally adjacent to type 1 via A (208A) and type 1 via C (208C). Type 1 via C (208C) has two design rule violations for being horizontally adjacent to type 1 via B (208B) and type 1 via D (208D). Type 1 via D (208D) has one design rule violation for being horizontally adjacent to type 1 via C (208C). Type 1 via E (208E) has two design rule violations for being vertically adjacent to type 1 via J (208J) and horizontally adjacent to type 1 via F (208F). Type 1 via F (208F) has three design rule violations for being horizontally adjacent to type 1 via E (208E) and type 1 via G (208G) and vertically adjacent to type 1 via K (208K). Type 1 via G (208G) has three design rule violations for being horizontally adjacent to type 1 via F (208F) and type 1 via H (208H) and vertically adjacent to type 1 via L (208L). Type 1 via H (208H) has two design rule violations for being horizontally adjacent to type 1 via G (208G) and vertically adjacent to type 1 via M (208M). Type 1 via J (208J) has two design rule violations for being vertically adjacent to type 1 via E (208E) and horizontally adjacent to type 1 via K (208K). Type 1 via K (208K) has three design rule violations for being horizontally adjacent to type 1 via J (208J) and type 1 via L (208L) and vertically adjacent to type 1 via F (208F). Type 1 via L (208L) has three design rule violations for being horizontally adjacent to type 1 via K (208K) and type 1 via M (208M) and vertically adjacent to type 1 via G (208G). Type 1 via M (208M) has two design rule violations for being horizontally adjacent to type 1 via L (208L) and vertically adjacent to type 1 via H (208H).

Figure 4:
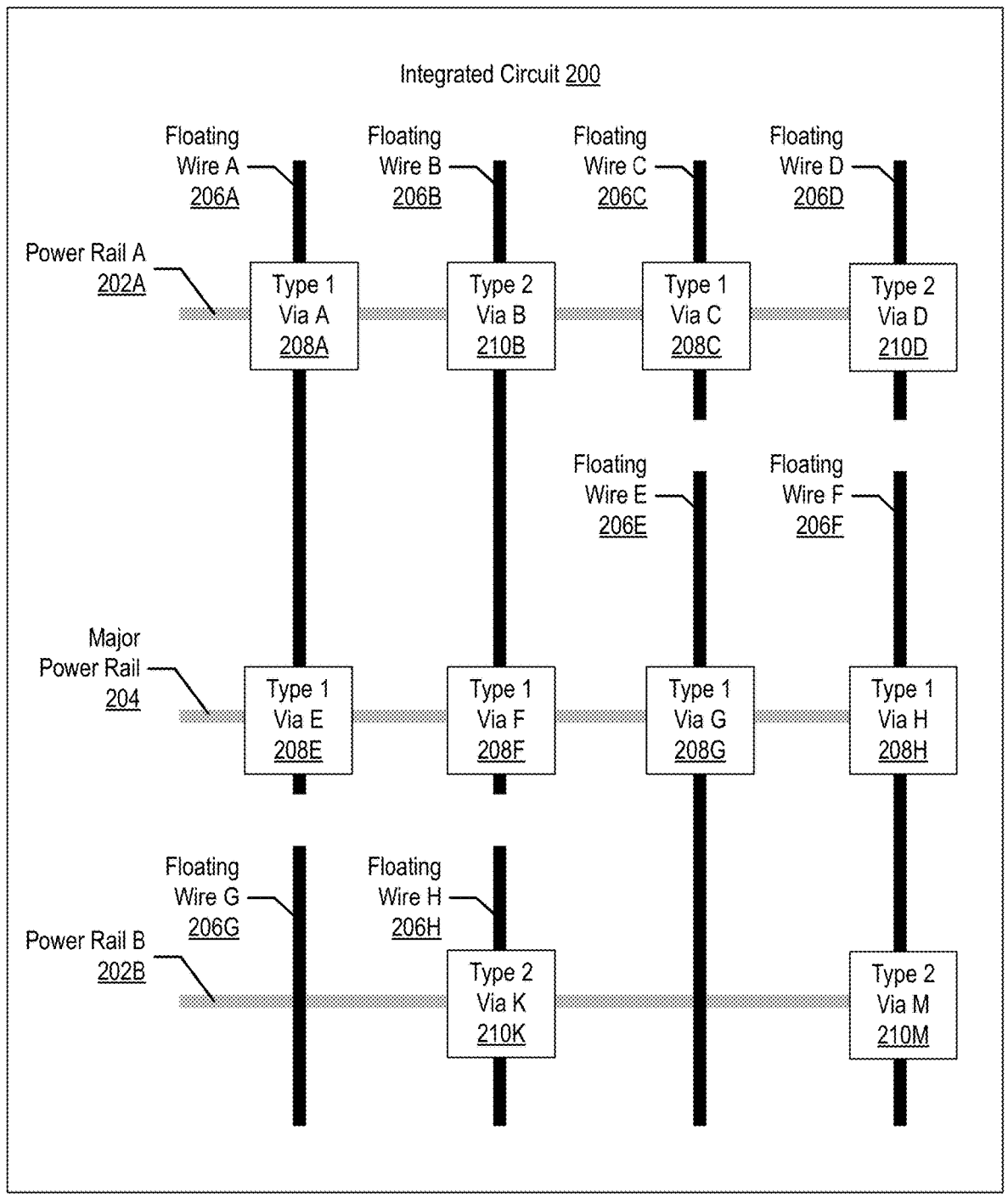
FIG. 4 sets forth a block diagram of an example system configured for using unused wires on VLSI chips for power supply decoupling according to embodiments of the present invention.

FIG. 4 shows an exemplary system for using unused wires on VLSI chips for power supply decoupling according to embodiments of the present invention. FIG. 4 shows the exemplary system at a stage in the process of efficiently placing vias to connect power rails to floating wires in order to create additional capacitance on an integrated circuit. Just before the stage depicted in FIG. 4, the design rule violations for each via not on a major power rail are resolved, including keeping each via not on a major power rail with resolvable design rule violations and removing each via not on a major power rail with unresolvable design rule violations.

The design rule violations have been resolved or removed in order of the vias with the greatest number of design rule violations to the least number of design rule violations. Type 1 via K (208K) and type 1 via L (208L) are not on the major power rail (204) and each have three design rule violations. The design rule violations for type 1 via K (208K) are resolvable because changing type 1 via K (208K) to type 2 via K (210K) resolves all three design rule violations. The design rule violations for type 1 via L (208L) are not resolvable once type 2 via K (210K) is placed horizontally adjacent to type 1 via L (208L), and type 1 via L (208L) is removed.

After the above actions are taken, type 1 via B (208B), type 1 via C (208C), and type 1 via J (208J) are not on the major power rail (204) and each have two design rule violations. The design rule violations for type 1 via B (208B) are resolvable because changing type 1 via B (208B) to type 2 via B (210B) resolves both design rule violations. Type 1 via C (208C) is left with only has one design rule violation. Type 1 via J (208J) is removed because a via of either type would be in violation of a design rule.

After the above actions are taken, type 1 via C (208C), type 1 via D (208D), and type 1 via M (208M) are not on the major power rail (204) and each have one design rule violation. The design rule violations for type 1 via C (208C) and type 1 via D (208D) are resolvable by changing type 1 via D (208D) to type 2 via D (210D). The design rule violation for type 1 via M (208M) is resolvable by changing type 1 via M (208M) to type 2 via M (210M). The result of the above actions is shown in FIG. 4.

Figure 5:
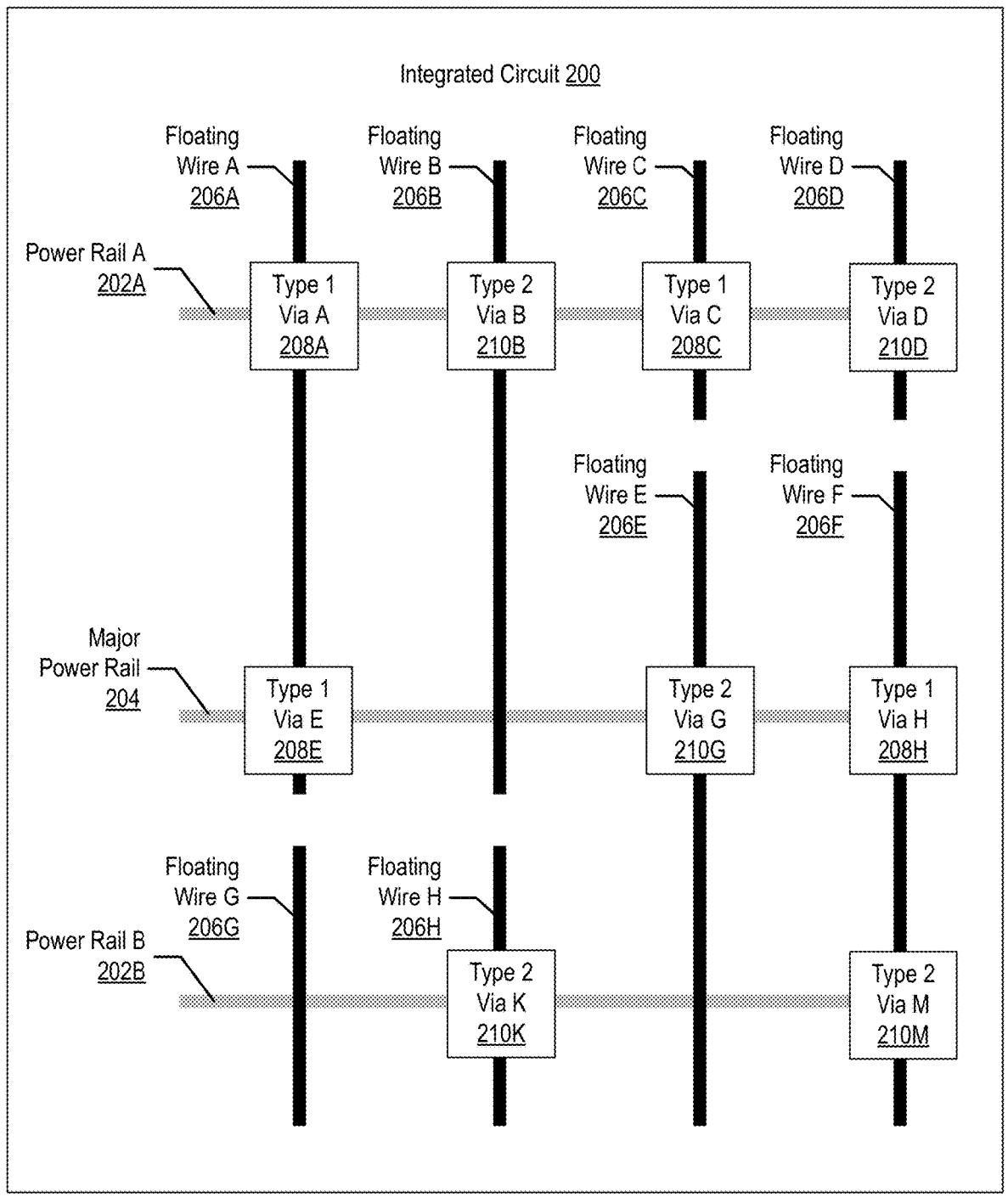
FIG. 5 sets forth a block diagram of an example system configured for using unused wires on VLSI chips for power supply decoupling according to embodiments of the present invention.

Just before the stage depicted in FIG. 5, the design rule violations for each via on a major power rail are resolved, including keeping each via on a major power rail with resolvable design rule violations and removing each via on a major power rail with unresolvable design rule violations. The design rule violations have been resolved or removed in order of the vias with the greatest number of design rule violations to the least number of design rule violations. Type 1 via F (208F) and type 1 via G (208G) are on the major power rail (204) and each have two design rule violations. Type 1 via F (208F) is removed because a via of either type would be in violation of a design rule. The remaining design rule violation for type 1 via G (208G) is resolvable by changing type 1 via G (208G) to type 2 via M (210G). After the above actions are taken, type 1 via E (208E) and type 1 via H (208H) no longer have design rule violations.

FIG. 5 shows an exemplary system for using unused wires on VLSI chips for power supply decoupling according to embodiments of the present invention. FIG. 5 shows the exemplary system at a stage in the process of efficiently placing vias to connect power rails to floating wires in order to create additional capacitance on an integrated circuit. After the design rule violations for each via on a major power rail are resolved, any remaining floating wires without a via are identified. As shown in FIG. 5, floating wire G (206G) remains without a via coupling floating wire G (206G) to a power rail.

Figure 6:
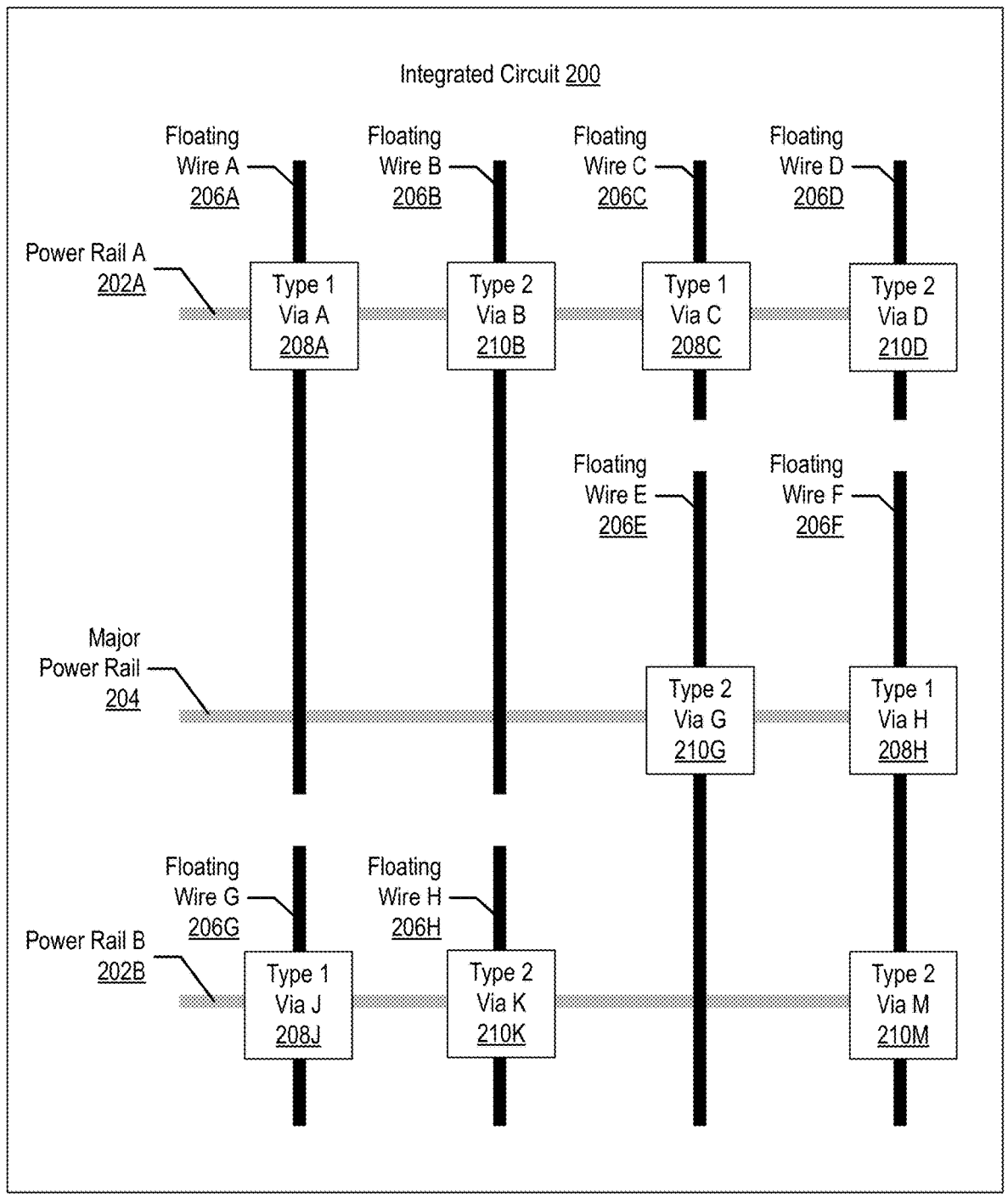
FIG. 6 sets forth a block diagram of an example system configured for using unused wires on VLSI chips for power supply decoupling according to embodiments of the present invention.

FIG. 6 shows an exemplary system for using unused wires on VLSI chips for power supply decoupling according to embodiments of the present invention. FIG. 6 shows the exemplary system at a stage in the process of efficiently placing vias to connect power rails to floating wires in order to create additional capacitance on an integrated circuit. Just before the stage depicted in FIG. 6, an intersection on the remaining floating wire (floating wire G (206G)) with the least number of design rule violations has been identified, and the design rule violations have been resolved by removing adjacent vias on adjacent wires. As shown in FIG. 5, floating wire A (206A) includes two vias (type 1 via A (208A) and type 1 via E (208E)). Type 1 via E (208E) is removed and type 1 via J (208J) is re-placed on floating wire G (206G). This action resolves the design rule violations for a via placed on floating wire G (206G) and leaves both floating wire A (206A) and floating wire G (206G) with at least one via connecting the wire to a power rail.

Figure 7:
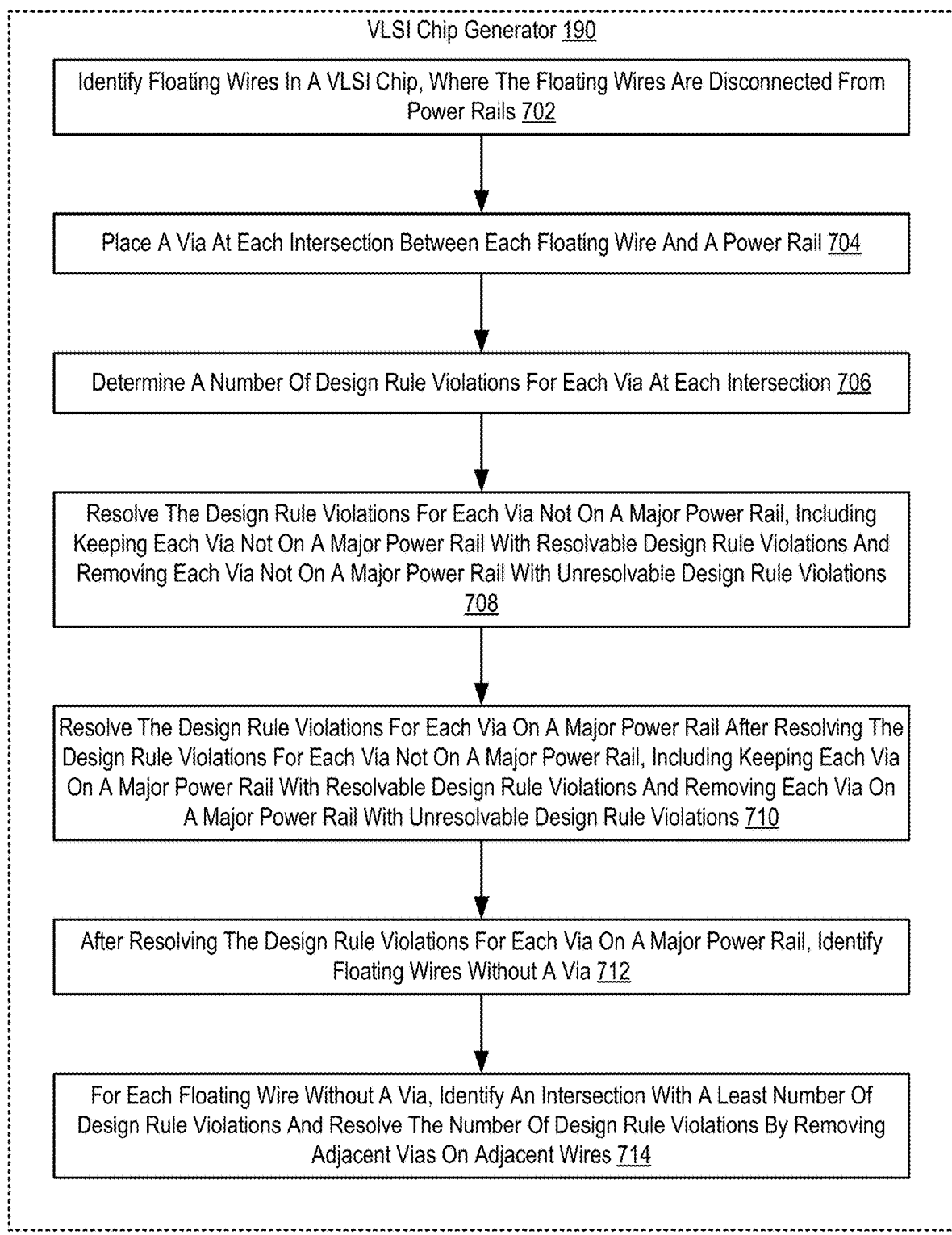
FIG. 7 sets forth a flow chart illustrating an exemplary method for using unused wires on VLSI chips for power supply decoupling according to embodiments of the present invention.

For further explanation, FIG. 7 sets forth a flow chart illustrating an exemplary method for using unused wires on very-large-scale integration (VLSI) chips for power supply decoupling according to embodiments of the present invention that includes generating a VLSI chip design. Specifically, FIG. 7 sets forth a flow chart that includes identifying (702) floating wires in a VLSI chip, wherein the floating wires are disconnected from power rails. Identifying (702) floating wires in a VLSI chip, wherein the floating wires are disconnected from power rails may be carried out by the VLSI chip generator (190) checking whether each contiguous wire (i.e., trace or shape) is coupled to at least one power rail. The contiguous wires not coupled to at least one power rail are identified as floating wires.

The VLSI chip generator (190) is hardware, software, or an aggregation of hardware and software that generates a VLSI chip design. The VLSI chip generator (190) may also manufacture a VLSI chip based on the VLSI chip design.

Once identified, the floating wires in the VLSI chip may then be attributed between power and ground. Specifically, adjacent floating wires (or groups of floating wires) are assigned to either power or ground such that only intersections between the floating wire and the attributed power or ground rails are considered for via placement. Attributing adjacent floating wires (or groups of floating wires) between power and ground creates a capacitance that may be used as decoupling capacitance for the integrated circuit.

The method of FIG. 7 further includes placing (704) a via at each intersection between each floating wire and a power rail. Placing (704) a via at each intersection between each floating wire and a power rail may be carried out by the VLSI chip generator (190) identifying each intersection between a floating wire and a major or non-major power rail for either power or ground (depending on which was attributed to the particular floating wire). Once each intersection is identified, a via is placed at the intersection. Initially, vias the of the same type may be placed at each intersection.

The method of FIG. 7 further includes determining (706) a number of design rule violations for each via at each intersection. Determining (706) a number of design rule violations for each via at each intersection may be carried out by the VLSI chip generator (190) evaluating the placement of each via and determining whether the via violates one or more design rules. The design rules dictate how vias may be placed on the integrated circuit. The design rules may specify a minimum distance between two vias (or two vias of the same type) before the vias are not compatible with a manufacturing process of the vias.

The method of FIG. 7 further includes resolving (708) the design rule violations for each via not on a major power rail, including keeping each via not on a major power rail with resolvable design rule violations and removing each via not on a major power rail with unresolvable design rule violations. Resolving (708) the design rule violations for each via not on a major power rail, including keeping each via not on a major power rail with resolvable design rule violations and removing each via not on a major power rail with unresolvable design rule violations may be carried out by the VLSI chip generator (190) evaluating each via with design rule violations and determining whether the design rule violations are resolvable or, if not resolvable, removing the via. Determining whether a design rule violation is resolvable may be carried out by altering the via placed at the intersection and determining if any design rule violations remain. Altering the via placed at the intersection may include changing a type of via placed at the intersection.

The design rule violations for vias not on a major power rail may be resolved before the design rule violations for vias on a major power rail. This ordering may result in more vias kept on the major power rails as resolving the design rule violations for vias not on a major power rail may result in the resolution of some design rule violations for vias on major power rails.

The method of FIG. 7 further includes resolving (710) the design rule violations for each via on a major power rail after resolving the design rule violations for each via not on a major power rail, including keeping each via on a major power rail with resolvable design rule violations and removing each via on a major power rail with unresolvable design rule violations. Resolving (710) the design rule violations for each via on a major power rail after resolving the design rule violations for each via not on a major power rail, including keeping each via on a major power rail with resolvable design rule violations and removing each via on a major power rail with unresolvable design rule violations may be carried out by the VLSI chip generator (190) evaluating each via with design rule violations and determining whether the design rule violations are resolvable or, if not resolvable, removing the via. Determining whether a design rule violation is resolvable may be carried out by altering the via placed at the intersection and determining if any design rule violations remain. Altering the via placed at the intersection may include changing a type of via placed at the intersection.

The method of FIG. 7 further includes, after resolving the design rule violations for each via on a major power rail, identifying (712) floating wires without a via. Identifying (712) floating wires without a via may be carried out by the VLSI chip generator (190) checking whether each contiguous wire is coupled to at least one power rail using a via. Identifying (712) floating wires without a via may be done after resolving the design rule violations for each via not on a major power rail and resolving the design rule violations for each via on a major power rail.

The method of FIG. 7 further includes, for each floating wire without a via, identify (714) an intersection with a least number of design rule violations and resolve the number of design rule violations by removing adjacent vias on adjacent wires. Identifying (714), for each floating wire without a via, an intersection with a least number of design rule violations and resolving the number of design rule violations by removing adjacent vias on adjacent wires may be carried out by the VLSI chip generator (190) placing a via at each intersection of the floating wire and determining the design rule violations. The VLSI chip generator (190) may then determine which vias create the fewest number of design rule violations as compared to the other vias.

Once the via or vias with the least number of design rule violations is determined, the via may be placed at the intersection and adjacent vias may be removed until no design rule violations remain. The VLSI chip generator (190) may attempt to remove the fewest number of adjacent vias in order to resolve the design rule violations. Adjacent vias may be removed by first determining whether an adjacent via is on a wire that includes at least one other via coupling the wire to a power rail. If the adjacent via is on a wire that includes at least one other via coupling the wire to a power rail, then removing the adjacent via will not result in the adjacent wire becoming a floating wire. Vias that do not result in the adjacent wire becoming a floating wire may be removed first in order to resolve the design rule violations.

Identifying (714) an intersection with a least number of design rule violations and resolving the number of design rule violations by removing adjacent vias on adjacent wires may be carried out using a data structure to store an identifier of each intersection and via associated with the number of design rule violations for that via and intersection. The data structure may be ordered to determine the via and intersection with the fewest number of design rule violations, and resolving the design rule violations may be attempted based on the order of the data structure.

Once the design rule violations have been resolved by removing adjacent vias on adjacent wires, the VLSI chip generator (190) may check the resulting VLSI chip design for remaining intersections without vias. The VLSI chip generator (190) may determine whether a via of any type may be placed at the intersection without creating a design rule violation. If a via of a particular type placed at a currently unoccupied intersection does not result in a design rule violation, then a via of that type may be placed at the intersection. For example, the VLSI chip generator (190) may discover an intersection without a via, and the intersection may be surrounded by type 2 vias. The VLSI chip generator (190) may place a type 1 via at the intersection and verify that the placement does not create any design rule violations.

After generating the VLSI chip design, the VLSI chip generator (190) may initiate a manufacturing of the VLSI chip based on the VLSI chip design. Specifically, the VLSI chip generator (190) may use the VLSI chip design to initiate the fabrication of a VLSI chip on a semiconductor, such as layers of silicon wafers.

The above-described limitations improve the operation of the computer system by increasing the decoupling capacitance of an integrated circuit. This is accomplished by utilizing unused floating wires for capacitance on the integrated circuit. Specifically, the above-described limitations efficiently place vias to connect power rails to floating wires in order to create additional capacitance on an integrated circuit.

Figure 8:
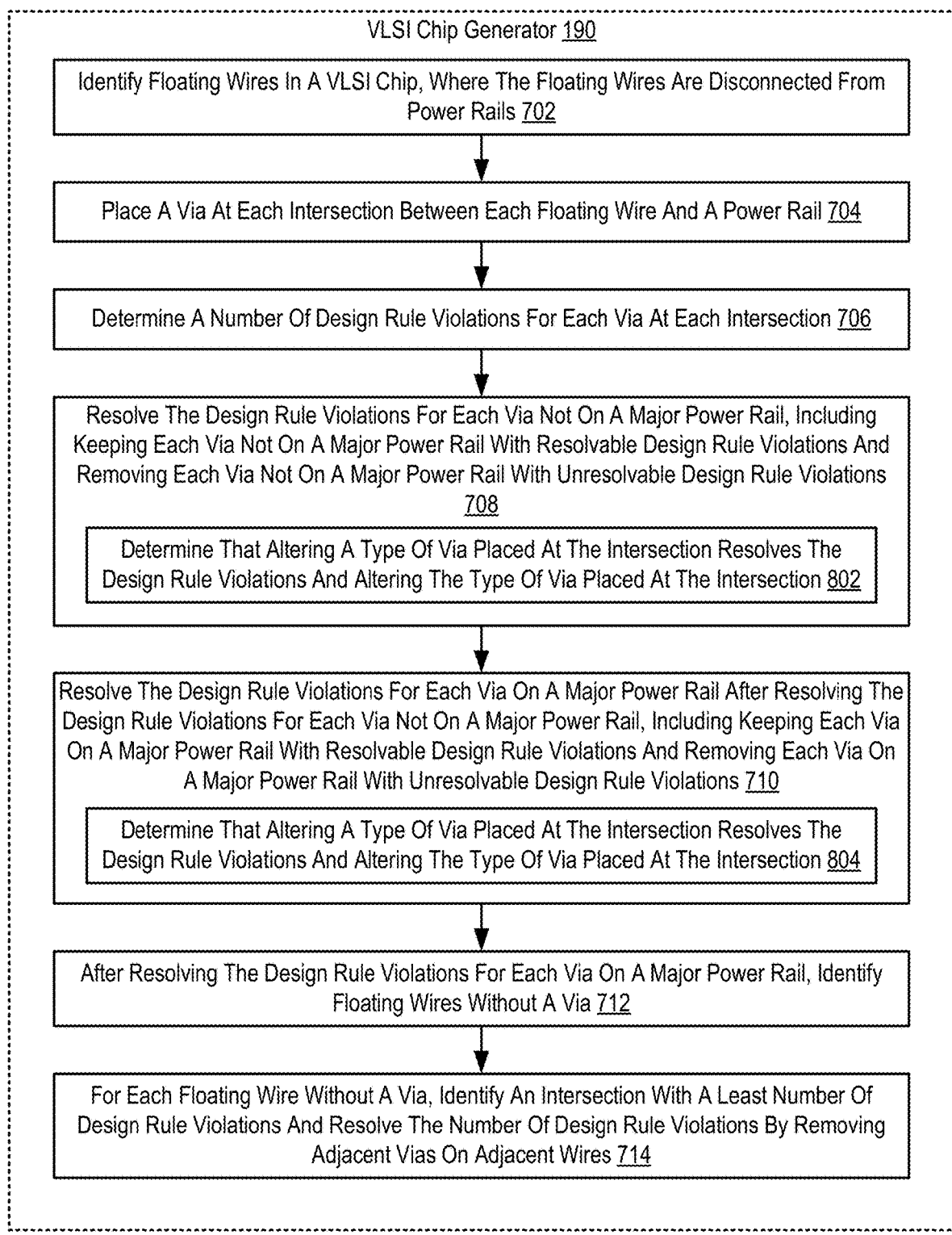
FIG. 8 sets forth a flow chart illustrating an exemplary method for using unused wires on VLSI chips for power supply decoupling according to embodiments of the present invention.

For further explanation, FIG. 8 sets forth a flow chart illustrating a further exemplary method for using unused wires on VLSI chips for power supply decoupling according to embodiments of the present invention that includes generating a VLSI chip design by: identifying (702) floating wires in a VLSI chip, wherein the floating wires are disconnected from power rails; placing (704) a via at each intersection between each floating wire and a power rail; determining (706) a number of design rule violations for each via at each intersection; resolving (708) the design rule violations for each via not on a major power rail, including keeping each via not on a major power rail with resolvable design rule violations and removing each via not on a major power rail with unresolvable design rule violations; resolving (710) the design rule violations for each via on a major power rail after resolving the design rule violations for each via not on a major power rail, including keeping each via on a major power rail with resolvable design rule violations and removing each via on a major power rail with unresolvable design rule violations; after resolving the design rule violations for each via on a major power rail, identifying (712) floating wires without a via; and for each floating wire without a via, identify (714) an intersection with a least number of design rule violations and resolve the number of design rule violations by removing adjacent vias on adjacent wires.

The method of FIG. 8 differs from the method of FIG. 7, however, in that resolving (708) the design rule violations for each via not on a major power rail, including keeping each via not on a major power rail with resolvable design rule violations and removing each via not on a major power rail with unresolvable design rule violations includes determining (802) that altering a type of via placed at the intersection resolves the design rule violations; and altering the type of via placed at the intersection. Determining (802) that altering a type of via placed at the intersection resolves the design rule violations; and altering the type of via placed at the intersection may be carried out by the VLSI chip generator (190) replacing the via at the intersection with a via of a different type and re-evaluating the design rule violations for the via at the intersection. If the design rule violations are resolved by altering the type of via at the intersection, then the via of the determined type is placed at the intersection.

The via type may refer to the size of via. The via type may also Each refer to a via that will be manufactured using a different process (i.e. mask). Specifically, vias of each type are vias added to the integrated circuit during one process of manufacture. For example, vias of a first type may be created using one pass of a light drawing process on the integrated circuit, and vias of a second type may be created using a second pass of the light drawing process.

Different types of vias may have different design rules. For examples, vias of one type may be no closer than 20 nanometers apart, while vias of another type may be no closer than 100 nanometers apart. Further, design rules may also specify how closely vias of different types may be placed. For example, design rules may specify that one type of via may be no closer than 30 nanometers from a via of another type.

The method of FIG. 8 also differs from the method of FIG. 7, however, in that resolving (710) the design rule violations for each via on a major power rail after resolving the design rule violations for each via not on a major power rail, including keeping each via on a major power rail with resolvable design rule violations and removing each via on a major power rail with unresolvable design rule violations includes determining (804) that altering a type of via placed at the intersection resolves the design rule violations; and altering the type of via placed at the intersection. As in the steps described with regard to step 802, determining (804) that altering a type of via placed at the intersection resolves the design rule violations; and altering the type of via placed at the intersection may be carried out by the VLSI chip generator (190) replacing the via at the intersection with a via of a different type and re-evaluating the design rule violations for the via at the intersection. If the design rule violations are resolved by altering the type of via at the intersection, then the via of the determined type is placed at the intersection.

Figure 9:
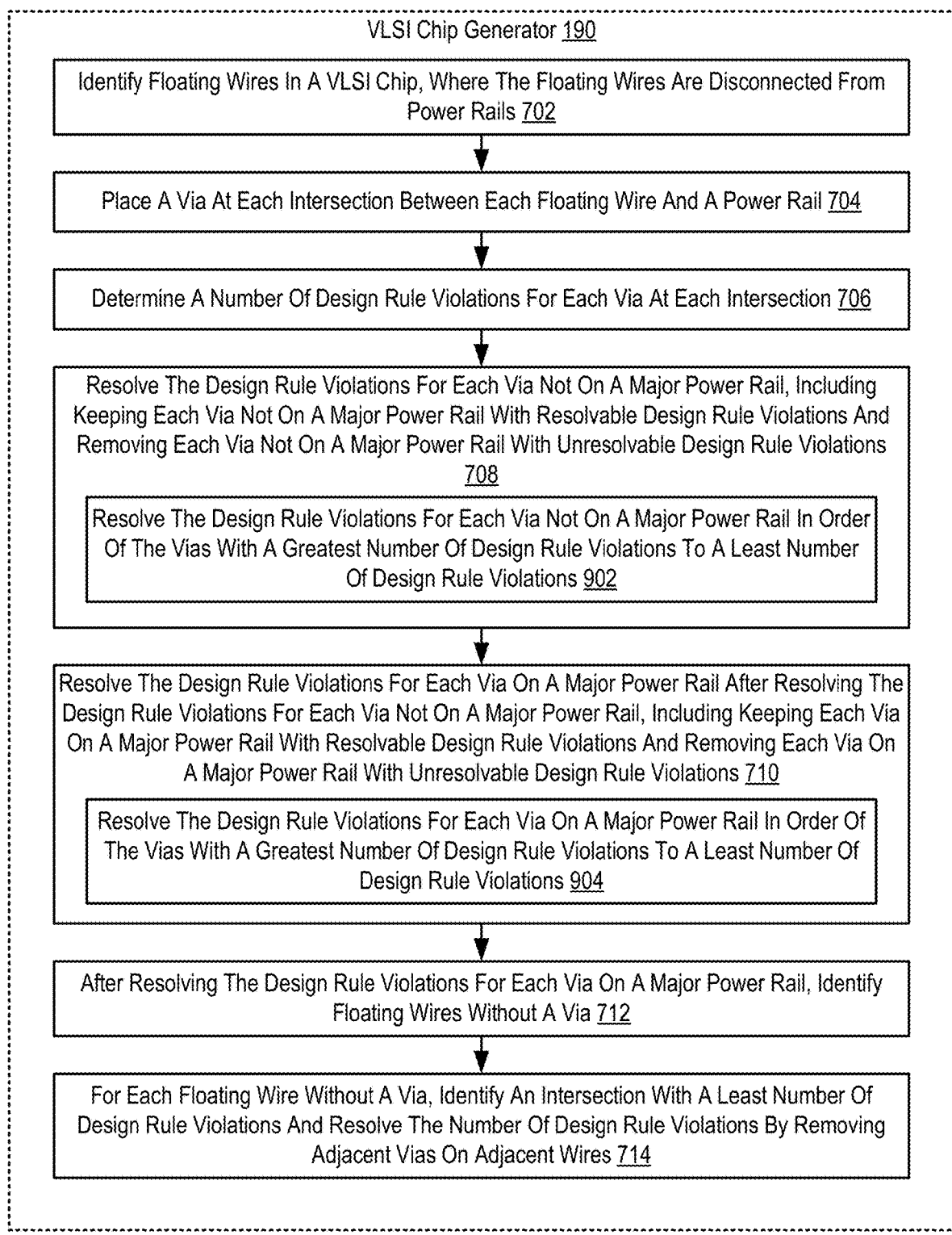
FIG. 9 sets forth a flow chart illustrating an exemplary method for using unused wires on VLSI chips for power supply decoupling according to embodiments of the present invention.

For further explanation, FIG. 9 sets forth a flow chart illustrating a further exemplary method for using unused wires on VLSI chips for power supply decoupling according to embodiments of the present invention that includes generating a VLSI chip design by: identifying (702) floating wires in a VLSI chip, wherein the floating wires are disconnected from power rails; placing (704) a via at each intersection between each floating wire and a power rail; determining (706) a number of design rule violations for each via at each intersection; resolving (708) the design rule violations for each via not on a major power rail, including keeping each via not on a major power rail with resolvable design rule violations and removing each via not on a major power rail with unresolvable design rule violations; resolving (710) the design rule violations for each via on a major power rail after resolving the design rule violations for each via not on a major power rail, including keeping each via on a major power rail with resolvable design rule violations and removing each via on a major power rail with unresolvable design rule violations; after resolving the design rule violations for each via on a major power rail, identifying (712) floating wires without a via; and for each floating wire without a via, identify (714) an intersection with a least number of design rule violations and resolve the number of design rule violations by removing adjacent vias on adjacent wires.

The method of FIG. 9 differs from the method of FIG. 7, however, in that resolving (708) the design rule violations for each via not on a major power rail, including keeping each via not on a major power rail with resolvable design rule violations and removing each via not on a major power rail with unresolvable design rule violations includes resolving (902) the design rule violations for each via not on a major power rail in order of the vias with a greatest number of design rule violations to a least number of design rule violations. Resolving (902) the design rule violations for each via not on a major power rail in order of the vias with a greatest number of design rule violations to a least number of design rule violations may be carried out by the VLSI chip generator (190) creating a priority list of the vias based on the number of design rule violations and resolving the design rule violations for the via or vias with the greatest number of design rule violations before resolving the design rule violations for the via or vias with a lesser number of design rule violations.

The method of FIG. 9 also differs from the method of FIG. 7, however, in that resolving (710) the design rule violations for each via on a major power rail after resolving the design rule violations for each via not on a major power rail, including keeping each via on a major power rail with resolvable design rule violations and removing each via on a major power rail with unresolvable design rule violations includes resolving (904) the design rule violations for each via on a major power rail in order of the vias with a greatest number of design rule violations to a least number of design rule violations. As in the steps described with regard to step 902, resolving (904) the design rule violations for each via on a major power rail in order of the vias with a greatest number of design rule violations to a least number of design rule violations may be carried out by the VLSI chip generator (190) creating a priority list of the vias based on the number of design rule violations and resolving the design rule violations for the via or vias with the greatest number of design rule violations before resolving the design rule violations for the via or vias with a lesser number of design rule violations.

In view of the explanations set forth above, readers will recognize that the benefits of using unused wires on VLSI chips for power supply decoupling according to embodiments of the present invention include:

Improving the operation of a computing system by increasing the decoupling capacitance of the integrated circuit, increasing circuit stability and improving performance.

Improving the operation of a computing system by maximizing the number of floating wires connected to power rails by placing as many vias at intersections between floating wires and power rails as the design rules allow, increasing circuit stability and improving performance.

Exemplary embodiments of the present invention are described largely in the context of a fully functional computer system for using unused wires on VLSI chips for power supply decoupling. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of using unused wires on very-large-scale integration (VLSI) chips for power supply decoupling, the method comprising:
    generating a VLSI chip design by:
        identifying floating wires in a VLSI chip, wherein the floating wires are disconnected from power rails;
        placing a via at each intersection between each floating wire and a power rail;
        determining a number of design rule violations for each via at each intersection;
        resolving the design rule violations for each via not on a major power rail;
        resolving the design rule violations for each via on a major power rail after resolving the design rule violations for each via not on a major power rail;
        after resolving the design rule violations for each via on a major power rail, identifying floating wires without a via; and
        for each floating wire without a via, identify an intersection with a least number of design rule violations and resolve the number of design rule violations.

2. The method of claim 1, further comprising manufacturing the VLSI chip using the VLSI chip design.

3. The method of claim 1, wherein resolving the design rule violations for each via not on a major power rail includes keeping each via not on a major power rail with resolvable design rule violations and removing each via not on a major power rail with unresolvable design rule violations, and wherein keeping each via not on a major power rail with a resolvable design rule violation comprises:
    determining that altering a type of via placed at the intersection resolves the design rule violations, and
    altering the type of via placed at the intersection; and
wherein resolving the design rule violations for each via on a major power rail after resolving the design rule violations for each via not on a major power rail includes keeping each via on a major power rail with resolvable design rule violations and removing each via on a major power rail with unresolvable design rule violations, wherein keeping each via on a major power rail with a resolvable design rule violation comprises:
    determining that altering a type of via placed at the intersection resolves the design rule violations, and
    altering the type of via placed at the intersection.

4. The method of claim 1, wherein resolving the design rule violations for each via not on a major power rail comprises resolving the design rule violations for each via not on a major power rail in order of the vias with a greatest number of design rule violations to a least number of design rule violations,
    and wherein resolving the design rule violations for each via on a major power rail comprises resolving the design rule violations for each via on a major power rail in order of the vias with a greatest number of design rule violations to a least number of design rule violations.

5. The method of claim 1, wherein identifying floating wires in a VLSI chip comprises attributing the floating wires between power and ground.

6. The method of claim 1, wherein the VLSI chip is a self-aligned double patterning chip.

7. The method of claim 1, wherein identifying floating wires in a VLSI chip comprises generating floating wires in locations on the VLSI chip requiring increased density.

8. An apparatus for using unused wires on VLSI chips for power supply decoupling, the apparatus comprising a computer processor, a computer memory operatively coupled to the computer processor, the computer memory having disposed within it computer program instructions that, when executed by the computer processor, cause the apparatus to carry out the steps of:
    generating a VLSI chip design by:
        identifying floating wires in a VLSI chip, wherein the floating wires are disconnected from power rails;
        placing a via at each intersection between each floating wire and a power rail;
        determining a number of design rule violations for each via at each intersection;
        resolving the design rule violations for each via not on a major power rail;
        resolving the design rule violations for each via on a major power rail after resolving the design rule violations for each via not on a major power rail;
        after resolving the design rule violations for each via on a major power rail, identifying floating wires without a via; and
        for each floating wire without a via, identify an intersection with a least number of design rule violations and resolve the number of design rule violations.

9. The apparatus of claim 8, wherein the computer program instructions further cause the apparatus to carry out the step of:
    manufacturing the VLSI chip using the VLSI chip design.

10. The apparatus of claim 8, wherein resolving the design rule violations for each via not on a major power rail includes keeping each via not on a major power rail with resolvable design rule violations and removing each via not on a major power rail with unresolvable design rule violations, and wherein keeping each via not on a major power rail with a resolvable design rule violation comprises:
    determining that altering a type of via placed at the intersection resolves the design rule violations, and
    altering the type of via placed at the intersection; and
wherein resolving the design rule violations for each via on a major power rail after resolving the design rule violations for each via not on a major power rail includes keeping each via on a major power rail with resolvable design rule violations and removing each via on a major power rail with unresolvable design rule violations, wherein keeping each via on a major power rail with a resolvable design rule violation comprises:

determining that altering a type of via placed at the intersection resolves the design rule violations, and altering the type of via placed at the intersection.

11. The apparatus of claim 8, wherein resolving the design rule violations for each via not on a major power rail comprises resolving the design rule violations for each via not on a major power rail in order of the vias with a greatest number of design rule violations to a least number of design rule violations, and wherein resolving the design rule violations for each via on a major power rail comprises resolving the design rule violations for each via on a major power rail in order of the vias with a greatest number of design rule violations to a least number of design rule violations.

12. The apparatus of claim 8, wherein identifying floating wires in a VLSI chip comprises attributing the floating wires between power and ground.

13. The apparatus of claim 8, wherein the VLSI chip is a self-aligned double patterning chip.

14. The apparatus of claim 8, wherein identifying floating wires in a VLSI chip comprises generating floating wires in locations on the VLSI chip requiring increased density.

15. A computer program product for using unused wires on VLSI chips for power supply decoupling, the computer program product disposed upon a computer readable medium, the computer program product comprising computer program instructions that, when executed, cause a computer to carry out the steps of:

generating a VLSI chip design by:

identifying floating wires in a VLSI chip, wherein the floating wires are disconnected from power rails;

placing a via at each intersection between each floating wire and a power rail;

determining a number of design rule violations for each via at each intersection;

resolving the design rule violations for each via not on a major power rail;

resolving the design rule violations for each via on a major power rail after resolving the design rule violations for each via not on a major power rail;

after resolving the design rule violations for each via on a major power rail, identifying floating wires without a via; and for each floating wire without a via, identify an intersection with a least number of design rule violations and resolve the number of design rule violations.

16. The computer program product of claim 15, wherein the computer program instructions further cause the computer to carry out the step of:

manufacturing the VLSI chip using the VLSI chip design.

17. The computer program product of claim 15, wherein resolving the design rule violations for each via not on a major power rail includes keeping each via not on a major power rail with resolvable design rule violations and removing each via not on a major power rail with unresolvable design rule violations, and wherein keeping each via not on a major power rail with a resolvable design rule violation comprises:

determining that altering a type of via placed at the intersection resolves the design rule violations, and altering the type of via placed at the intersection; and wherein resolving the design rule violations for each via on a major power rail after resolving the design rule violations for each via not on a major power rail includes keeping each via on a major power rail with resolvable design rule violations and removing each via on a major power rail with unresolvable design rule violations, wherein keeping each via on a major power rail with a resolvable design rule violation comprises:

determining that altering a type of via placed at the intersection resolves the design rule violations, and altering the type of via placed at the intersection.

18. The computer program product of claim 15, wherein resolving the design rule violations for each via not on a major power rail comprises resolving the design rule violations for each via not on a major power rail in order of the vias with a greatest number of design rule violations to a least number of design rule violations, and wherein resolving the design rule violations for each via on a major power rail comprises resolving the design rule violations for each via on a major power rail in order of the vias with a greatest number of design rule violations to a least number of design rule violations.

19. The computer program product of claim 15, wherein identifying floating wires in a VLSI chip comprises attributing the floating wires between power and ground.

20. The computer program product of claim 15, wherein the VLSI chip is a self-aligned double patterning chip.

* * * * *